United States Patent [11] 3,626,388

[72] Inventor Yoshihiro Uno
Kadoma, Osaka, Japan
[21] Appl. No. 816,916
[22] Filed Apr. 17, 1969
[45] Patented Dec. 7, 1971
[73] Assignee Matsushita Electric Industrial Co., Ltd.
Osaka, Japan
[32] Priorities Apr. 24, 1968
[33] Japan
[31] 43/2840;
Apr. 25, 1968, Japan, No. 43/27851;
Apr. 25, 1968, Japan 43/27849;
Dec. 4, 1968, Japan 43/89772

[54] STORAGE DEVICE HAVING AN ALKALI-HALIDE STORAGE SURFACE
6 Claims, 12 Drawing Figs.

[52] U.S. Cl. 340/173 LM, 117/213, 313/91, 340/173 CR
[51] Int. Cl. G11c 13/04, H01j 29/12
[50] Field of Search 340/173; 96/36.2, 94 BF; 117/210, 212, 213; 313/89, 91

[56] References Cited
UNITED STATES PATENTS

| | | | |
|---|---|---|---|
| 1,187,282 | 6/1916 | Doetsch | 117/213 |
| 2,745,772 | 5/1956 | Cassman | 117/210 |
| 3,218,496 | 11/1965 | Jensen | 117/212 X |
| 3,240,601 | 3/1966 | Stalnecker | 96/36.2 |
| 3,408,531 | 10/1968 | Goetze | 340/173 X |
| 3,560,782 | 2/1971 | Hamann | 313/91 X |

OTHER REFERENCES
Roland, Screen for Dark Trace Tube, 8/65, IBM Technical Disclosure Bulletin, Vol. 8, No. 3, 313-91

*Primary Examiner*—Bernard Konick
*Assistant Examiner*—Stuart Hecker
*Attorney*—Stevens, Davis, Miller & Mosher

ABSTRACT: A storage device having a storage surface formed with an evaporated alkali-halide film which is divided into a plurality of minute sections that are disposed either on a single plane or on different planes. The storage surface provides increased cohesion with the backplate and freedom from buildup of electrical charge. The storage surface finds application to a storage device of either the light-transmitting or light-reflection type.

STORAGE DEVICE HAVING AN ALKALI-HALIDE STORAGE SURFACE

The invention relates to a storage device for optically storing information, of the type employing a storage surface of an evaporated alkali-halide film. A storage device of this type is known, wherein information is stored in the form of images in a storage surface attached to a backplate, the images being produced by an incident electron beam, and erased by heating the storage surface. A serious disadvantage with such a device is that the thin storage surface is apt to peel off from the backplate when the temperature of the device changes, due to the difference between the coefficients of thermal expansion of the storage surface and the backplate.

It is an object of the present invention to provide a storage device of this type wherein the effects of this disadvantage are at least partly removed.

The invention accordingly provides a storage device for optically storing information, wherein a storage surface comprising an evaporated alkali-halide film having an irregular surface is disposed on one surface of a transparent backplate together with a heating and discharging conductor.

The irregular surface may be provided in several different ways, as discussed in detail hereinbelow. The storage device preferably includes means for preventing or minimizing buildup of electrical charge on the storage surface.

Pure alkali-halide crystals are ionic crystals with a face-centered cubic lattice which are transparent throughout the spectral range of between the infrared region of 4,000 m$\mu$ and the ultraviolet region of 200 m$\mu$. If a lattice defect occurs in such crystals and an electron is trapped at the lattice position corresponding to a halogen ion vacancy, then absorption of light of a certain wavelength results. The optical absorption of this type is ascribed to the creation of an F-center effect. The F-center can be induced, for instance, by irradiation of the crystals with electron beams and is observed not only in single crystals but in a surface formed by vacuum evaporation of a fine polycrystalline surface formed by evaporation under reduced pressure. The central wavelengths of the F-center optical absorption band (F-band) varies according to the type of the alkali-halide used and ranges substantially throughout the visible spectrum: the F-band central wavelengths of sodium chloride, potassium chloride and potassium bromide, for example, are known to occur at the wavelengths of 458 m$\mu$, 556 m$\mu$ and 625 m$\mu$, respectively, with a half-value bandwidth of about 100 m$\mu$.

The F-centers induced by irradiation of the evaporated fine crystalline surface with electron beams can be erased by heating the particular surface. Consequently the evaporated alkali-halide crystalline surface finds application as a storage surface utilizing an electron beam as a "pen" for writing in the given information, and heating means for erasing the information when required.

In the drawings:

FIG. 1 is a view showing, in lengthwise section, the general construction of a storage device which employs a target according to the invention, the device being illustrated to be of light-transmitting type by way of example;

FIGS. 2*a* and 2*b* are top plan views showing the configurations of alternative forms of the target for use in the device of FIG. 1;

FIGS. 3*a* and 3*b* are sectional views taken on line I—I and line II—II of FIGS. 2*a* and 2*b*, respectively;

FIG. 4 is similar to FIGS. 2*a* and 2*b* but showing another configuration of the target;

FIGS. 4*a* and 4*b* are sectional views taken on line III—III of FIG. 4;

In the embodiment hereinafter described, the alkali-halide storage surface is exemplified by a surface formed by evaporation of potassium chloride, for the sake of simplicity of discussion.

Figure 1:
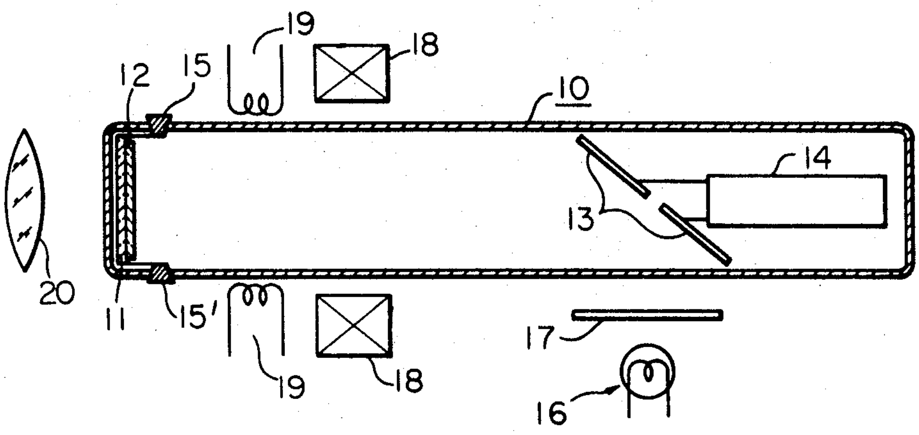

First referring to FIG. 1, the storage device to which the present invention is applicable has an evacuated glass envelope 10 enclosing therein a backplate 11 of glass or mica, a storage surface 12 of evaporated potassium chloride carried by the backplate 11, reflecting mirrors 13 facing the storage surface 12 at a predetermined angle and an electron gun 14 for writing in the information supplied thereto. To the face of the backplate 11 is applied a transparent electrically resistive material of the nature to be described later. The resistive material is connected to electrodes 15 and 15' and as it becomes energized through the electrodes, heat is generated therein and transferred to the storage surface, thereby erasing any of the F-centers that have been induced in the surface. The surface 12 being translucent, may lend itself to a storage device of either the light-reflecting or light-transmitting type; the storage device under discussion is illustrated to be of the latter type as an example. The mirrors 13 are intended to transfer the light incident from the light source 16 through the band-pass filter 17 to the storage surface 12. The band-pass filter 17 may be so positioned as to have its band center coincident with the center of the F-center absorption band. The band-pass filter 17 may be dispensed with if desired.

The storage device of the shown type further comprises, as customary, focus coils 18 for focusing electron beams to a fine spot, deflection coils 19 for deflecting the electron beams focused by the coils 18, and a projection lens 20 for projecting images of the storage surface 12 on to the screen (which surface is, in this instance, considered to play the part of a slide in a slide projector).

The storage surface 12 is formed of fine potassium chloride crystals of a size in the order of 1 $\mu$, so that an image comprising, a large number of fine pieces of information can be written in the surface.

Now, the experiments conducted to evaluate the sensitivity and retention characteristics of storage surfaces formed by vacuum evaporation of potassium chloride reveal that the optical density (O.D.) of the storage surfaces are, insofar as the density is not very high, may be expressed as:

$$\text{O.D.} = \log_{10}\frac{\text{intensity of incident light}}{\text{intensity of transmitted light}}$$

$$= B \cdot Q^{A}\left(\frac{t}{0.001}\right)^{\exp\left(E_0 - \frac{E}{KT}\right)}$$

where *A*: a constant determined by the particular material evaporated and by the condition of evaporation (if potassium chloride is evaporated at an angle of 45° then $A = 0.79$);

*B*: a constant determined by the thickness of the evaporated film and the electron beam accelerating voltage;

*Q*: the amount of charge;

*t*: in days time;

*E* and $E_o$: constants ($E_o$ = 10.5 and $E$ = 0,36 if potassium chloride is used);

*K*: Boltzmann factor;

*T*: temperature.

It is known from this equation and other experiments that a considerable amount of charge is required for the sake of attaining a sufficient order of optical density of the image written in. If, for instance, the thickness of the potassium chloride film is 12.5 $\mu$ (i.e., 2.37 mg./cm.$^2$), the angle of evaporation 45°, and the electron beam accelerating voltage 27 kv., then the electron beams will have to provide a change density of up to 20 $\mu Q$/cm.$^2$ to obtain a contrast ratio of 10 and up to 100 $\mu Q$/cm.to obtain a contrast ratio of 100. This leads to the requirements of 1. the storage surface having a thermal capacity which is sufficient to prevent the surface from being heated by the electron beams, which would erase the F-centers unwantedly;

2. reducing the thermal capacity of the backplate for facilitating the erasing of the F-centers in the storage surface;

3. strengthening the adhesive power of the storage surface, to the backplate: the storage surface which is about 10 $\mu$ thick, tends to be peeled off the backplate due to the difference between the coefficients of thermal expansion of the storage surface and the backplate; and 4. protecting the storage surface from the buildup of electrical charge: the film of evaporated polycrystalline potassium chloride is an insulator rather than a conductor, although it exhibits a higher conductivity than the film of evaporated single crystal.

In order to meet requirements of 1 and 2, the backplate which is 50 to 500 $\mu$ thickness may be used with satisfactory results if it is made of glass. Requirement 3 will be satisfied by dividing the storage surface into a plurality of minute sections which are attached to the backplate. To comply with requirement 4, it will be advantageous to mount a conductive film over the storage surface in its entirety or to dispose a plurality of wires on the surface in the form of parallel lines or a mesh having a fine pitch.

Thus, the invention contemplates the provision of an information-storage device employing a storage surface of alkali-halide with a heating element for erasing the information stored in the surface. Special consideration is given to the storage surface of the invention so as to prevent it from peeling off the backplate and to prevent the buildup of electrical charge on the surface while the storage device is in use.

Figure 2A:
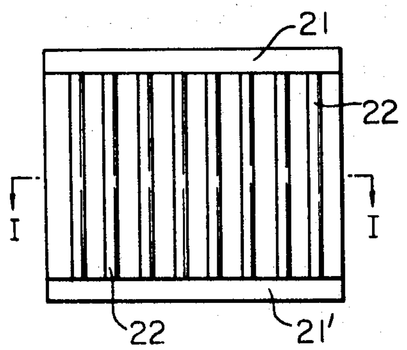
Figure 2B:
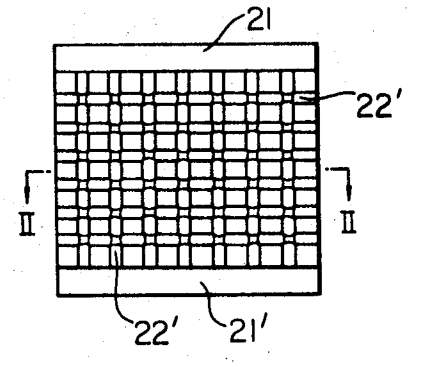

Referring to FIGS. 2*a* and 2*b*, the backplate 11 is provided at both its ends with a pair of electrodes 21 and 21′ which are connected to electrodes 15 and 15′, respectively. The electrodes 21 and 21′ may be made of a suitable material having a low electric resistance such as a conductive paint or an evaporated or plated metal. The electrodes 21 and 21′ are connected together by a plurality of wires. The wires may be arranged either in parallel with each other, as indicated by 22 in FIG. 2*a*, or in the form of a mesh as indicated by 22′ in FIG. 2*b*. It is desired that the wires 22 or 22′ be as fine as possible and disposed with as fine a pitch as possible. Under the present stage of the art, the wires can be manufactured, with sufficient reliability, with the thickness of 10 $\mu$ or less and disposed with a pitch of 20 $\mu$ or less. It is also desired that the proportion of the total area of the wires to the overall surface area of the backplate be kept to a minimum. The wires may be applied to the backplate in various manners, but only one preferred example is described here.

Figure 3A:
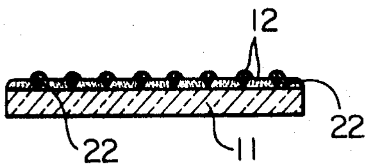
Figure 3B:
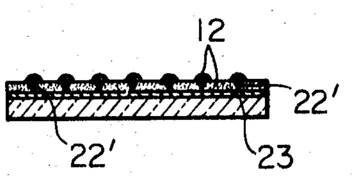

First a suitable metallic material such as chromium is vacuum evaporated coextensively onto the surface of the backplate, whereupon a suitable photoresistive material is further evenly applied thereto. A negative mask with a pattern of the desired configurations of the wires 22 or 22′ is placed on the photoresistive surface. The photoresistive surface with the overlying negative mask is then exposed to ultraviolet rays and is thereafter developed. The portions of the photoresistive surface that have been exposed to the ultraviolet rays thus form a pattern corresponding to the wires 22 or 22′. These portions are then chemically polished and the remaining photoresistive material removed, with the result that the corresponding portions of the underlying metallic surface are exposed in the pattern of the wires 22 or 22′. By plating these portions of the metallic surface with nickel using the resultant wires as an electrode, there will be obtained fine wires of inverted triangular section, as seen in FIGS. 3*a* and 3*b*. In this instance, the plating may be alternately carried out be vacuum evaporation of nickel, using an evaporation mask having slits formed in the desired pattern of the wires.

Onto the backplate 11 which has thus been provided with the electrodes 21 and 21′ and a pattern of the wires 22 or 22′, there is now evaporated potassium chloride crystals so as to form a storage surface 12 which is divided into minute sections by the wires 22 or 22′, as seen from FIG. 3*a* or 3*b*, respectively. If the potassium chloride crystals are evaporated under a high vacuum the evaporated potassium chloride is not likely to sufficiently overlay the enlarged outer faces of the wires with inverted triangular section. If, however, it is evaporated in an atmosphere of argon under reduced pressure, the evaporated potassium chloride will reach the reduced roots of the wires.

If desired, a transparent conductive film 23 may be interposed between the wires and backplate for more effectively preventing the buildup of charge on the storage surface, as shown in FIG. 3*b*.

The wires thus applied to the backplate serve to heat the storage surface for effectively erasing the information stored therein, prevent the surface from being electrified, and provide an irregular surface by dividing the surface into minute sections substantially separated from each other, thereby to prevent the surface from being peeled off the backplate due to the difference in the coefficients of thermal expansion of the storage surface and the backplate.

Figure 4:
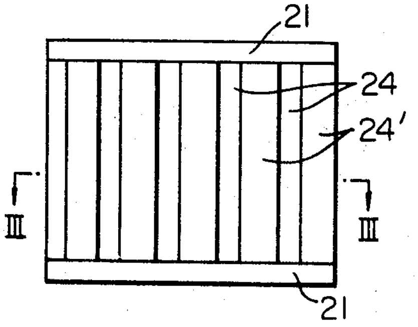
Figure 4A:
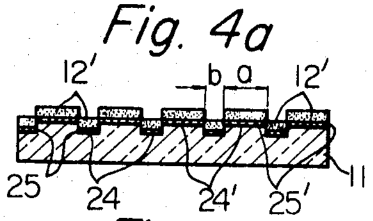
Figure 4B:
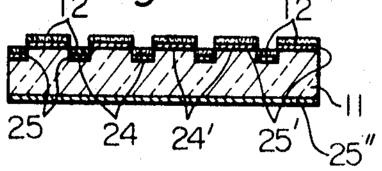

The dividing of the storage surface into minute sections to provide an irregular surface may be put into practice in other ways, examples being shown in FIG. 4 and FIGS. 4*a* and 4*b*.

As illustrated, the backplate 11 has formed therein a plurality of grooves 24 separated by lands 24′. Upon the bottom faces of the grooves 24 and the top faces of the lands 24′ are superposed transparent resistive films 25 and 25′, respectively, of, for example, stannic oxide, which serve as a heater for the storage surface. In this instance, the resistive film 25 to be applied to the bottom faces of the grooves 24 need not necessarily be transparent. The grooves 24 may be formed by use of suitable photoresistive material and hydrofluoric acid. The ratio of the width *a* of the land 24′ to the width *b* of the groove 24 may be determined suitably. Designated at 12′ are thin strips of an alkali-halide surface evaporated onto the conductive films 25 and 25′.

It may be noted that the resistive films 25 and 25′ serve not only to heat the storage surface 12′ but to prevent the buildup of charge thereon. An additional heating element, moreover, may be attached to the opposite face of the backplate as represented by 25″ in FIG. 4*b*.

The irregular surface of the storage surface may be formed, in lieu of providing grooves in the backplate, by applying separate films of transparent resistive material partially to the uniplanar face of the backplate upon which the storage layer is evaporated.

Figure 5:
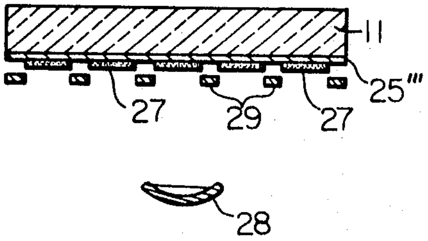
FIG. 5 is a sectional view showing a further modified form of the target.

Alternatively, the transparent resistive film may be applied evenly to the entire surface of the backplate with the alkali-halide crystals evaporated partially on the resultant transparent resistive film 25‴ to form a plurality of separate alkali-halide films which are designated at 27 in FIG. 5. Such separate alkali-halide films 27 may be formed in such a manner that the alkali-halide crystals are evaporated onto the resistive film 25‴ from an evaporating source 28 through a mask 29 of stripe or mesh pattern. The portions of the mask 29 confronting the backplate serve as a barrier to the evaporated alkali-halide.

Figure 6:
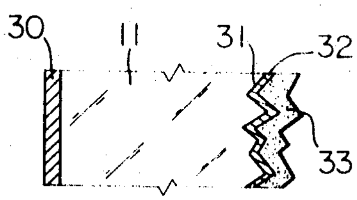
FIG. 6 is a fragmentary view in section on an enlarged scale of a further modified form of the target.

In order to have the storage surface secured to the backplate with increased strength, the face of the backplate to which the alkali-halide film is attached may be finished to have a rough surface by sandblast processing. More specifically, as illustrated in FIG. 6 on an enlarged scale, the backplate 11 of glass is provided on one face thereof with a transparent resistive film 30 serving as a heater and the other face is formed as a jagged surface 31. To jagged surface 31 of the backplate 11 and in conformity thereto is applied a transparent conductive film 32. The alkali-halide crystals are evaporated onto the rough surface of the conductive film 32 so that the resultant alkali-halide film 33 formed thereupon displays also a jagged surface.

The roughness of the thus formed storage surface, which usually is of the order of several to several 10 microns, contributes to dispersing the force resulting from the difference in the coefficients of thermal expansion of the alkali-halide film and the backplate so that the former is effectively prevented from peeling off the latter. As the face of the backplate to which the alkali-halide crystals are to be evaporated is not entirely parallel to the opposite uniplanar face of the backplate, the alkali-halide vapor is transferred at an angle to the backplate so that an increased contrast ratio can be obtained, as will be appreciated with reference to the previously quoted equation. The alkali-halide film 33 is in close contact with the surface 31 of the backplate 11, with the thin conductive film 32 interposed therebetween and no substantial decrease in the resolving power occurs despite the rough surface of the backplate (so long as the electron beam is larger in size than the roughness of the sandblasted surface).

Figure 7:
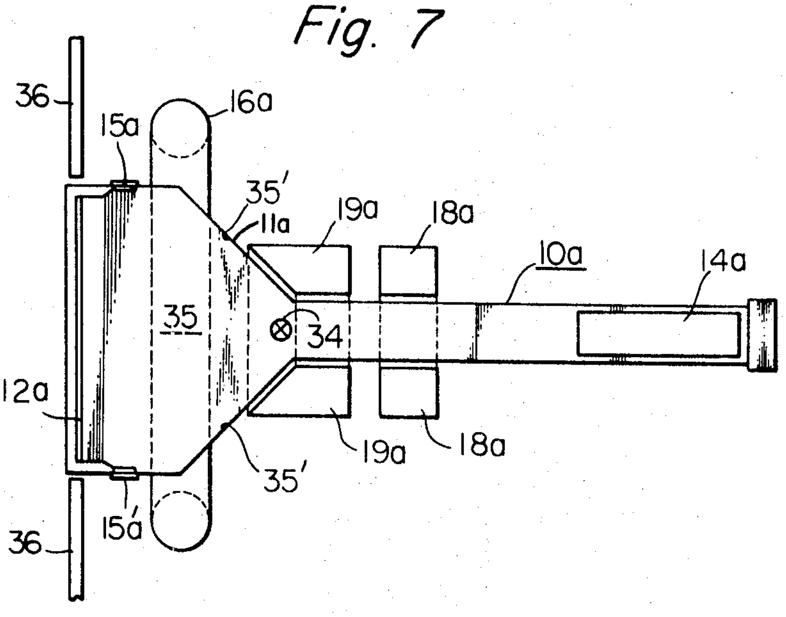
FIGS. 7 and 8 are views similar .o FIG. 1 but showing other forms of the device.

The storage surface so arranged may also find effective application in a storage device which is constructive in the manner illustrated in FIG. 7. The device of the type herein illustrated has an evacuated glass envelope 10*a* accommodating therein a storage surface 12*a* attached to the panel face, a pair of anode buttons 15*a* and 15*a'* for supplying a voltage to erase the information stored, and an electron gun 14*a* for writing-in the information.

The storage device further comprises outside of the glass envelope 10*a* focus coils 18*a* for focusing electron beams, deflection coils 19*a* for deflecting the electron beams focused by the focus coils 18*a*, and a light source 16*a* such as an annular fluorescent lamp for irradiating the storage surface 12*a*. In forming the storage surface 12*a* in the device of this construction, the potassium chloride is evaporated from the position indicated by 34 with the glass envelope 10*a* held in an upright position, whereby the potassium chloride can be deposited throughout the inner surface 35' of the funnel 35. If, in this instance, the potassium chloride is evaporated at an angle to the backplate 11*a*, then the surface on which the evaporated potassium chloride is deposited becomes more whitish than a case where the potassium chloride is evaporated at a right angle thereto. Therefore, when light is emitted from the light source 16*a* in a direction to directly irradiate the inner surface 35' of the funnel 35, the inner surface 35' will serve as a light-scattering surface so that the storage surface will be irradiated evenly by the light incident from the surface 35'.

Thus radiation of the light from the light source 16*a* will facilitate viewing of the images formed in the storage surface 12*a* by indirectly illuminating the storage surface Furthermore, since the potassium chloride surface 12*a* is quite thick, the images resulting from the creation of F-centers are formed on the side of the surface 12*a* facing the electron gun 14*a*, so that irradiation of the storage surface 12*a* from the inner surface 35' of the funnel 35 is useful for clearly viewing the images.

It is preferable to have a transparent conductive film disposed over the inner surface of the funnel, thereby to connect the storage surface 12*a* with the anode buttons 15*a* and 15*b*. Such a transparent conductive film may be replaced by a meshed or fluted graphite film or a film of evaporated aluminum. Processing the inner surface of the funnel with sand blasting, in addition, will enable clearer viewing of the images. The sand blasting processing may be replaced by the application of magnesium oxide powder to the inner surface of the funnel, or a milky glass may be used in lieu of the sand blasted glass.

A shield means for shielding the light incident upon the viewer directly from the light source 16*a* is shown at 36.

Figure 8:
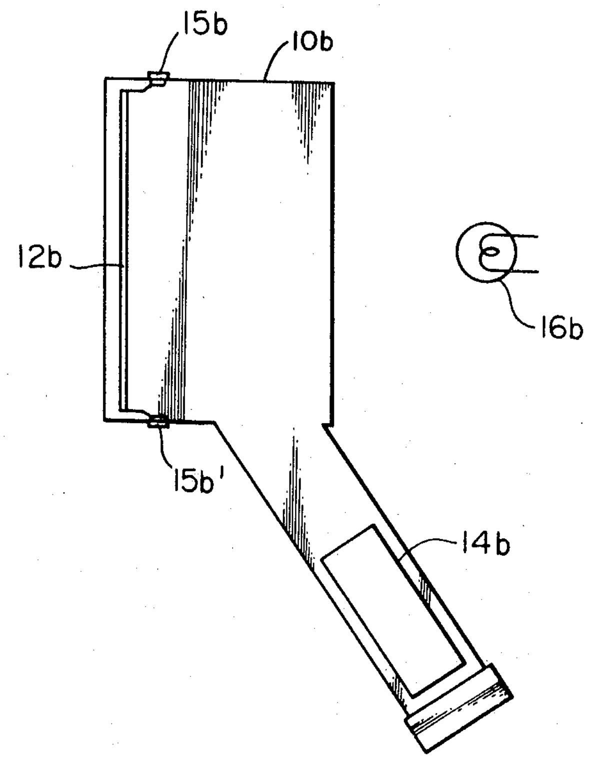

The storage surface of the invention may also be used in a storage device of the type illustrated in FIG. 8, which device comprises, essentially similarly to the counterparts of FIGS. 1 and 7, a glass envelope 10*b* accommodating an evaporated storage surface 12*b*, an electron gun 14*b*, anode buttons 15*b* and 15*b'*, a light source 16*b*, and other parts not specifically designated for simplicity of illustration.

According to the present invention, not only a heating means and discharging means are disposed on the backplate but also the storage surface is made irregular to prevent it from being peeled off the backplate without reducing the resolving power.

I claim:

1. A storage device for optically storing information comprising a transparent backplate, an electrically resistant heating element disposed on one surface of said backplate, and a storage surface of an alkali-halide film evaporated on said one surface of said backplate which has said electrically resistant heating element disposed thereon, said storage surface being provided with a plurality of irregularities.

2. A storage device as defined in claim 1, wherein a transparent conductive film is disposed on said one surface of said backplate and under said electrically resistant heating element and said storage surface.

3. A storage device as defined in claim 1, wherein said one surface of said transparent backplate is provided with a plurality of grooves and said electrically resistant heating element is composed of transparent resistive films.

4. A storage device as defined in claim 3, wherein an electrically resistant heating element is disposed on the other surface of said backplate.

5. A storage device for optically storing information comprising a transparent backplate having a jagged surface, an electrically resistant heating element disposed coextending on said jagged surface of said backplate, and a storage surface of an alkali-halide film evaporated on said electrically resistant heating element, said storage surface and said electrically resistant heating element each having a jagged surface corresponding to said jagged surface of said backplate.

6. A storage device as defined in claim 5, wherein an electrically resistant heating element is disposed on the other surface of said backplate.

* * * * *

UNITED STATES PATENT OFFICE
CERTIFICATE OF CORRECTION

Patent No. 3,626,388 Dated December 7, 1971

Inventor(s) Yoshihiro UNO

It is certified that error appears in the above-identified patent and that said Letters Patent are hereby corrected as shown below:

In the Claim for Convention Priority, one of the four Japanese application is wrong and should be corrected as follows:

--Japan, Patent Appln. N° 43/28401 filed April 24, 1968-- instead of "43/2840".

Signed and sealed this 4th day of July 1972.

(SEAL)
Attest:

EDWARD M.FLETCHER, JR.
Attesting Officer

ROBERT GOTTSCHALK
Commissioner of Patents